United States Patent
Twilley

(10) Patent No.: US 6,451,083 B1
(45) Date of Patent: Sep. 17, 2002

(54) HARDENED PARTICLE COMPRISING A REACTION PRODUCT OF METAL BAGHOUSE DUST

(76) Inventor: Robert Kevin Twilley, P.O. Box 256, Salisbury, MD (US) 21803

( * ) Notice: Subject to any disclaimer, the term of this patent is extended or adjusted under 35 U.S.C. 154(b) by 0 days.

(21) Appl. No.: 09/590,872

(22) Filed: Jun. 9, 2000

(51) Int. Cl.$^7$ .................................................. C22B 1/16
(52) U.S. Cl. ............................ 75/313; 75/319; 75/322; 75/320
(58) Field of Search ........................ 75/313, 319, 322, 75/320

(56) References Cited

U.S. PATENT DOCUMENTS

| | | | |
|---|---|---|---|
| 3,894,865 A | * | 7/1975 | Wienert ...................... 75/10.67 |
| 4,878,944 A | | 11/1989 | Rolle et al. |
| 4,889,640 A | | 12/1989 | Stanforth |
| 4,911,757 A | | 3/1990 | Lynn et al. |
| 5,037,479 A | | 8/1991 | Stanforth |
| 5,245,122 A | | 9/1993 | Smith |
| 5,336,297 A | | 8/1994 | McElroy |
| 5,338,336 A | | 8/1994 | Greenwalt |
| 5,439,505 A | * | 8/1995 | Krofchak ...................... 75/773 |
| 5,496,392 A | | 3/1996 | Sims et al. |
| 5,557,031 A | | 9/1996 | Al-Sugair et al. |
| 5,722,929 A | * | 3/1998 | Smith et al. ................. 588/257 |
| 5,833,735 A | * | 11/1998 | Grandin et al. ................ 75/544 |
| 5,855,645 A | * | 1/1999 | Myerson et al. ............... 75/419 |
| 5,871,561 A | | 2/1999 | Okada et al. |
| 5,922,261 A | | 7/1999 | Ford, Jr. |
| 6,258,149 B1 | * | 7/2001 | Sugiyama et al. ............. 75/484 |

FOREIGN PATENT DOCUMENTS

| | | | | |
|---|---|---|---|---|
| JP | | 56139633 A | * 10/1981 | |
| JP | | 2247015 A | * 10/1987 | ................... 75/319 |

OTHER PUBLICATIONS

Hackh's Chemical DIctionary, pp. 141–42. 1969.*
Hazardous Materials Management, Southam Environment Group, *Recycling Electric Arc Furnace Dust: The Zinc Iron Plasma Process (ZIPP)*, Apr./May 1995 Issue.
S. Street, *EnvIRONment and Other Bath Smelting Processes for Treating Organic and Ferrous Wastes*, JOM, 50(4) (1998), pp. 43–47 no month.

* cited by examiner

Primary Examiner—Roy King
Assistant Examiner—Tima McGuthry, Banks
(74) *Attorney, Agent, or Firm*—Wood, Herron & Evans, L.L.C.

(57) ABSTRACT

Metal baghouse dust can be solidified and thereby used for a variety of different purposes including a binder material by blending the electric arc furnace dust with a reducing agent such as ferrous chloride or ferrous sulphate. This forms a solidified mass which has excellent hardness and high temperature strength enabling it to be directly added to molten metal. Particles coated with hardened metal baghouse dust can be used in the Midrix process or can be used to add carbon to molten metal. This is an excellent way to dispose of waste metal baghouse dust.

17 Claims, 1 Drawing Sheet

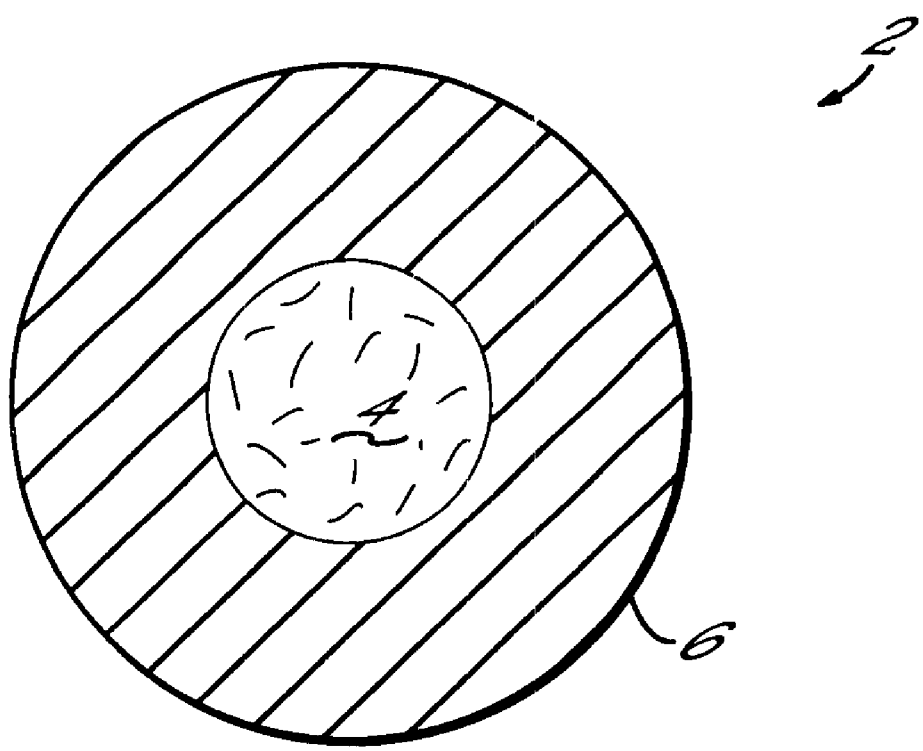

HARDENED PARTICLE COMPRISING A REACTION PRODUCT OF METAL BAGHOUSE DUST

The present invention relates to a process for the utilization of electric arc furnace dust by forming a solid mass which can be used in other high temperature production processes.

BACKGROUND

In all steel production processes, waste materials are formed that contain oxidized iron and other oxidized metals such as calcium zinc, lead, chromium and cadmium. These are usually in the form of dust in the gas waste streams. This is collected in a baghouse and is referred to as baghouse dust. Dust from the electric arc furnace process is also referred to as electric arc furnace dust. This dust is difficult to process because of its fine particle size. Reintroducing the dust in to a reduction furnace to recover the iron will result in the dust once again becoming a part of the waste stream. Even though the dust contains a substantial amount of metal content, it is essentially worthless.

There are methods of storing and stabilizing the dust into piles near the production facility, but this is becoming increasingly unacceptable as environmental regulations become stricter. The dust can also be recycled and stabilized into ceramic or building materials but not necessarily on a cost-effective basis.

Of particular concern, however, is the dust created from processes typically used to recycle scrap metal. The scrap metal may come from a variety of sources such as automobiles, railroad rails, and discarded structural and sheet steel. Different mills generate a wide variation i.e., the exact composition of the metal baghouse dust. For example, electric arc furnace dust typically contains relatively large proportions of zinc, iron, and lead and smaller proportions of tin, cadmium, chromium, copper, silica, lime, and alumina. Some of the lead oxide, for example, is probably from the recycling of engine blocks which have become impregnated with lead from gasoline before the unleaded gas era and that of chromium oxide from metal scrap that had been coated with zinc chromate.

Due to the presence of the toxic oxides, the Environmental Protection Agency classifies this metal baghouse dust as a hazardous waste thus its disposal has become a major problem for steel producers. For example, to safely dispose the dust in a land fill the dust must be rendered nontoxic by removing the toxic heavy metals or by immobilizing the toxic materials in a stabilized composition for disposal or in a recycled product. Hence, there has been considerable effort to develop a treatment process for EAF dust that is economical.

U.S. Pat. No. 5,336,297 (McElroy) describes a process for treating EAF dust to make it suitable for disposal in a land fill and at the same time recovering the nonferrous metals zinc and lead for remarketing. The dust is first leached with a ferric chloride solution followed by a series of steps involving elevated temperature and pressure to form a filterable crystalline hematite. The zinc is recovered using a series of steps involving solvent extraction, stripping, and electrolysis. The lead is recovered as a precipitate upon cooling of the solution.

Another process to render EAF dust suitable for disposal in landfills is disclosed in U.S. Pat. No. 4,911,757 (Lynn et al). The process is based on the pozzolanic reaction of materials which ultimately adsorb and/or physically entrap heavy metals into a calcium-alumina-silicate matrix. The hazardous materials become virtually immobile and stable. An alkaline dry mixture of EAF dust is made by mixing it with lime kiln dust, fly ash, and hydrated line. An aqueous ferrous hydroxide and calcium sulfate solution is then added to the dry mixture and blended; during this process the EAF dust is rendered nonhazardous. Another method based on the pozzolanic reaction is provided in U.S. Pat. No. 5,245,122 (Smith). A hardened product is formed when the EAF dust is mixed with lime, ferrous sulfate, and water.

U.S. Pat. No. 5,922,261 (Ford, Jr.) provides a process for converting the EAF dust into both a fuel source and a material from which iron can be recovered. The iron containing dust is mixed with a carbon material, such as coal fines, a resin, such as a styrene polymer in a hygroscopic solvent, and a homopolymer, such as polyvinyl acetate. The resulting mixture is then compressed into some type of form, such as briquettes or pellets.

Another method for processing environmentally toxic materials in EAF dust that also provides fuel and a charging material for making molten iron or steel preproducts is described in U.S. Pat. No. 5,338,336 (Greenwalt). Petroleum coke, oxygen and EAF dust are reacted in a melter gasifier to produce reduction gas. The reduction gas is recycled to a reduction furnace that is connected to the melter gasifier where molten iron from the iron oxides is formed, and zinc, cadmium, and lead oxides are reduced, vaporized and subsequently recovered.

Using EAF dust to improve concrete or mortar materials is described in U.S. Pat. No. 5,557,031 (Al-Sugair et al.). The dust is essentially used as a partial replacement or additive for cement to enhance the cement's workability and strength. The cement concurrently serves as a means to dispose EAF dust.

There has been considerable effort to find a means to render metal baghouse dust nonionic or to recycle the dust in some useful product. However, the economic feasibility of these processes is either unsure or unacceptable. In addition, the question still lingers as to how safe a product is that has metal baghouse dust as part of its composition, that is, are the toxic materials in the product really immobilized or rendered nontoxic. A need thus exists to use or treat metal baghouse dust in an economic and an environmentally safe way.

SUMMARY OF THE INVENTION

The present invention is premised upon the realization that metal bag house dust such as electric arc furnace dust can be solidified thereby permitting its use for a variety of different applications such as a binder and the like.

More particularly addition of an effective reducing agent to metal baghouse dust causes hardening of the metal baghouse dust thereby enabling it to be used as a binder or to be pelletized for further use.

The hardened product provides a means to add metal baghouse dust back to molten metal. Further it provides a binder which enables solidification and formation of pellets of other powders such as iron oxide and coal. Further the solidified product can be formed as a coating to encapsulate other products again enabling their use in various applications particularly applications requiring elevated temperatures. The present invention will be further appreciated in light of the following detailed description and drawings in which:

BRIEF DESCRIPTION OF THE DRAWINGS

The FIGURE is a cross-sectional view of a core material encapsulated with the binder of the present invention.

DETAILED DESCRIPTION

Metal baghouse dust is the solids recovered from the off-gases from production of molten steel including electric arc furnaces, basic oxygen furnaces and blast furnaces. Generally this is recovered in a baghouse. Basically the dust includes small fines of metal oxides. The predominant material is iron oxide forming generally up to 26% to 40% of the metal baghouse dust. The second major component is calcium oxide and this usually forms 10% to about 30% of the product. The remainder will be oxides of zinc, chromium, lead, magnesium, manganese, sodium, nickel and potassium. These generally will form anywhere from the range of 0% to 10%. Generally metal baghouse dust will always include iron, calcium, zinc and chromium. The metal baghouse dust is a very fine powder. Generally it has particle size of about less than 200 mesh which makes it totally unsuitable per se for adding back to any type of molten metal. A more detailed analysis of electric arc furnace dust is disclosed in U.S. Pat. No. 5,557,031, the disclosure of which is incorporated herein by reference.

The metal baghouse dust is formed into a binder composition by blending it with an effective reducing agent which causes the dust to solidify. Particularly suitable reducing agents include ferrous chloride and ferrous sulphate. These when combined with water effectively cause the metal baghouse dust to solidify.

The binder composition will generally contain about 0.1 to 15% or more of the reducing agent by weight. Increasing the amount of the reducing agent tends to cause the product to set up more quickly.

The binder composition also includes a sufficient quantity of water to dissolve the reducing agent. Generally a viscous slurry is formed. Additional water can be added up to the point where the product no longer solidifies or the hardness of the product is unsatisfactory. Further the reducing agent is preferably dissolved in water prior to addition to the metal baghouse dust. Iron chloride in particular can be purchased as an aqueous solution containing 30–45% iron chloride with less than 3–4% hydrochloric gas with the remainder water. Another good source of ferrous chloride or ferrous sulfate is HCl or $H_2SO_4$ based spent pickling liquor which is also a waste product. This can be used as is or can be blended with additional water, ferrous chloride or ferrous sulfate to achieve the desired concentration.

Depending upon the application, the required hardness of the binder can vary widely. The required crush strength can vary from anywhere from 10 psi up to several hundred psi depending upon application. Varying the amount of reducing agent and water will effectively control hardness.

The hardness of the product is maximized by using from about 10% to 20% reducing agent, 30% to 60% water by weight, and the remainder metal baghouse dust. These can be blended together in any order and are preferably blended together at room temperature. Further, the hardness can be increased by using ferrous chloride as the reducing agent although ferrous sulfate can be used in most applications.

In a less preferred embodiment, the dust can be combined with water and will harden after a period of 5–24 hours. But the strength is poorer. This product is suitable for certain applications.

The binder can be formed in a variety of different manners. For example, the metal baghouse dust can be combined with an aqueous solution of the reducing agent and simply allowed to set. This will form a hardened mass in a period of about one to 24 hours at ambient temperature.

Pellets of the binder can be formed by simply combining the metal baghouse dust with the reducing agent either as a solid subsequently adding water or combining the reducing agent dissolved in water in a pelletizer. Any commercially available pelletizer can be used in the present invention. Suitable pelletizers include SD-390 FEECO Discs.

Although pellets of the binder are useful per se to add iron oxide back to molten iron, the binder can also be used to form coated particles. A desired center particle can be added to the pelletizer and coated with the binder.

The FIGURE represents such a coated particle 2. Particle 2 includes a core particle 4 which has a diameter from about 0.5 to about 0.75 inches and an exterior coating 6 of the binder which has a thickness of 0.25 to 0.5 inches or more. The core can be a preformed particle such as a 0.5" diameter coal particle. Preferably, however, it is a blend of binder and a particulate material. Such a center core particle 4 can be formed from particulate material by simply combining the particulate material such as iron oxide, coal, coke or silicon dioxide and the like to the binder composition i.e., the metal baghouse dust, reducing agent and water. The binder can form from 0.1 to about 99.9% by weight of the core and the particulate material 0.1 to 99% by weight. Preferably the particulate material will be 10% to 90%. Increasing the amount of the added particulate material simply affects the hardness of the core material. Where harder materials are required, the amount of binder composition is increased. However, in any application it is preferred to maximize the content of the particulate material while maintaining a sufficient hardness.

To form the core, the binder and additive are formed into particles in a pelletizer or similar equipment. After hardening (generally 1–24 hours), the core pellets can then be used as is or can be coated, as shown in the FIGURE, with an outer layer 6 of binder. To accomplish this the core particles 4 after solidified are coated in a pelletizer with additional binder utilizing the same method as previously indicated for formation of the particles.

In certain applications it may be desirable to increase the high temperature strength of the product. This can be done by adding clay such as bentonite in an amount up to about 7% of the overall mass of the core material.

The solidified pellets of the present invention can be used in a variety of different applications. If the core material is a blend of coal or coke, this can be used to add carbon to iron. Typically coal is added to scrap charge buckets to provide a less expensive heat source in bringing the scrap metal to a molten state. When the coal is added directly, 60–70% of the heat is lost before the roof is placed over the electric arc furnace. However the coal or coke powder encased in the binder of the present invention is protected and it does not burn until well after the roof has been placed over the furnace. Thus this permits the metal baghouse dust to be added back to molten metal and facilitates addition of coal or coke to scrap metal in a furnace.

If the added particulate material in the core is iron oxide powder, this can be used to add iron oxide in the Midrex process where iron oxide is reduced to iron forming iron pellets which can subsequently be melted and used. Further, the metal baghouse particles without any core can simply be added back to molten metal in order to utilize the metal content of the electric arc furnace dust.

The pelleted binder composition of the present invention can also be used as an aggregate and added to concrete. The binder composition can also be used as a cementitious liner material for a wide variety of different products. It can be combined for example with hematite to form a radioactive barrier layer.

The binder composition is suitable for any application requiring a moldable or formable solidifying mass similar to concrete. This invention allows one to utilize a waste product and add it back to scrap metal or to provide a wide variety of different products.

This has been a description of the present invention along with the preferred method of practicing the invention. However, the invention itself should only be defined by the appended claims wherein

I claim:

1. A hardened particle comprising the reaction product of metal baghouse dust and a reducing agent dissolved in water, wherein said reducing agent is selected from the group consisting of ferrous chloride and ferrous sulphate.

2. The particle claimed in claim 1 whereby said reducing agent is spent pickling liquor.

3. The particle claimed in claim 1 comprising 10% to 20% reducing agent and 30% to 60% water.

4. The particle claimed in claim 1 wherein said metal baghouse dust is electric arc furnace dust.

5. The particle claimed in claim 1 wherein said metal baghouse dust consists essentially of metal oxide.

6. The particle claimed in claim 5 wherein said metal oxide consists essentially of iron oxide, calcium oxide, zinc oxide, and chromium oxide.

7. A feed material for a Midrex Reduction Process comprising a particle, said particle comprising a solidified mass in combination with iron oxide powder, said mass formed from metal baghouse dust and a reducing agent dissolved in water, said reducing agent is selected from the group consisting of ferrous chloride and ferrous sulphate.

8. A hardened particle comprising the reaction product of metal baghouse dust and a reducing agent dissolved in water, wherein said metal baghouse dust consists essentially of metal oxide.

9. The particle claimed in claim 8 wherein said metal baghouse dust is electric arc furnace dust.

10. The particle claimed in claim 8 wherein said metal oxide comprises oxides of metals selected from the group consisting of iron, calcium, zinc, chromium, lead, magnesium, manganese, sodium, nickel, and potassium.

11. The particle claimed in claim 10 wherein said metal oxide comprises iron oxide in at least about 26% by weight.

12. The particle claimed in claim 11 wherein said metal oxide further comprises calcium oxide in at least about 10% by weight.

13. The particle claimed in claim 12 wherein said iron oxide is present in about 26% to about 40% by weight and said calcium oxide is present in about 10% to about 30% by weight.

14. A hardened particle comprising the reaction product of metal baghouse dust and a reducing agent dissolved in water, said reducing agent is selected from the group consisting of ferrous chloride and ferrous sulphate and said metal baghouse dust is electric arc furnace dust consisting essentially of metal oxide, said metal oxide comprising at least 26% iron oxide and at least 10% calcium oxide.

15. A hardened particle comprising a central core coated with a hardened mass formed from metal baghouse dust and a reducing agent dissolved in water.

16. The hardened particle claimed in claim 15 wherein said central core comprises:

an additive material selected from the group consisting of coal powder, coke, iron oxide, silicon dioxide, clay and mixtures thereof;

a reducing agent;

water; and metal baghouse dust.

17. The hardened particle claimed in claim 16 having a crush strength greater than 10 psi.

* * * * *